United States Patent
Münz

(10) Patent No.: US 10,333,347 B2
(45) Date of Patent: Jun. 25, 2019

(54) METHOD AND CONTROL DEVICE FOR CONTROLLING AN ELECTRICAL GRID

(71) Applicant: SIEMENS AKTIENGESELLSCHAFT, München (DE)

(72) Inventor: Ulrich Münz, München (DE)

(73) Assignee: Siemens Aktiengesellschaft (DE)

( * ) Notice: Subject to any disclaimer, the term of this patent is extended or adjusted under 35 U.S.C. 154(b) by 115 days.

(21) Appl. No.: 15/265,219

(22) Filed: Sep. 14, 2016

(65) Prior Publication Data
US 2017/0104366 A1    Apr. 13, 2017

(30) Foreign Application Priority Data
Oct. 7, 2015   (DE) ......................... 10 2015 219 407

(51) Int. Cl.
| | | |
|---|---|---|
| H02J 13/00 | (2006.01) | |
| H02J 3/24 | (2006.01) | |
| H02J 3/36 | (2006.01) | |
| H02J 1/08 | (2006.01) | |
| H02J 3/12 | (2006.01) | |
| H02J 3/00 | (2006.01) | |

(52) U.S. Cl.
CPC ............ *H02J 13/0096* (2013.01); *H02J 1/08* (2013.01); *H02J 3/12* (2013.01); *H02J 3/24* (2013.01); *H02J 3/36* (2013.01); *G05B 2219/2639* (2013.01); *H02J 2003/007* (2013.01); *Y02E 60/60* (2013.01); *Y02E 60/76* (2013.01); *Y04S 40/22* (2013.01)

(58) Field of Classification Search
None
See application file for complete search history.

(56) References Cited

U.S. PATENT DOCUMENTS

2008/0177425 A1   7/2008   Korba et al.

FOREIGN PATENT DOCUMENTS

| DE | 10 2013 221 750 A1 | 5/2014 |
|---|---|---|
| DE | 10 2013 211 840 A1 | 12/2014 |
| EP | 2 299 555 A1 | 3/2011 |

OTHER PUBLICATIONS

F. Yang, C. Chen, X.T. Wang and Y.X. Xu: "Decentralized Coordinated Control of Multi-Infeed HVDC System for Damping Inter-Area Oscillation"; International Journal of Power and Energy Systems, Bd.29, NF. 3, pp. 1-5, XP055340714, ISSN: 1710-2243, I0 .2316 / Journal .203 .2009 . 3 .203-4344; 2009.

(Continued)

*Primary Examiner* — Carlos R Ortiz Rodriguez
(74) *Attorney, Agent, or Firm* — Schmeiser, Olsen & Watts LLP

(57) ABSTRACT

An electrical grid, using physical operating data of the electrical grid a current operating status of the electrical grid is determined by way of a network model of the electrical grid is provided. A first grid component is controlled as a function of a control signal by a regulator with a grid-component-internal control circuit which is adjustable via control parameters. A first component model of the first grid component is imported to determine a dynamic reaction of the first grid component to the control signal depending on the control parameters.

12 Claims, 2 Drawing Sheets

(56) References Cited

OTHER PUBLICATIONS

Fankhauser H R et al: "Advanced simulation techniques for the analysis of power system dynamics", IEEE Computer Applications in Power, IEEE Inc. Newyork, US, Bd. 3, Nr. 4, pp. 31-36, XP011419339, ISSN. 0895-0156, DOI: 10.1109/67.60751 pp. 31-pp. 35 ; 1990.
Harbans Nakra: "Real-Time Simulator for Power System Dynamics Studies", IEEE Transactions on Power Systems, IEEE Service Center, Piscataway, NJ, US, Bd. 10, Nr. 2, pp. 1063-1070, XP000544100, ISSN: 0885-8950, DOI: 10.1109/59.387952, pp. 1063-pp. 1067; 1995.
Kamwa I et al. "Low-Order Black-Box Models for Control System Design in Large Power Systems", IEEE Transactions on Power Systems, IEEE Service Center, Piscataway, NJ, US, Bd. 11, Nr. 1, pp. 303-311, XP011050206, ISSN: 0885-8950, pp. 303-pp. 305; 1996.
Mao Xiao-Ming et al: "Researches on Coordinated control Strategy for Inter-area Oscillations in AC/DC Hybrid Grid With Multi-infeed HVDC"; 2005 IEEE/PES Transmission & Distribution; Conference & Exposition: Asia and Pacific, Dalian, 2005; pp. 1-6. IEEE Xplore; doi: 10.1109/TDC.2005.1547023; 2005.

METHOD AND CONTROL DEVICE FOR CONTROLLING AN ELECTRICAL GRID

CROSS-REFERENCE TO RELATED APPLICATION

This application claims priority to German Application No. 10 2015 219 407.8 having a filing date of Oct. 7, 2015 the entire contents of which are hereby incorporated by reference.

FIELD OF TECHNOLOGY

Contemporary electrical grids generally include a number of grid components such as power generators, consumer loads, power lines, control devices, power stations, wind power installations, photovoltaic installations and/or other conventional or renewable sources of energy as well as control components such as adjustable transformers and so-called FACTS (Flexible AC Transmission Systems). The electrical grids can, for example, be power supply grids, transmission networks, distribution networks or feed-in networks, which, in particular, can be configured as alternating current grids or direct current grids, e.g. as HVDC systems (HVDC: High Voltage Direct Current).

BACKGROUND

As a rule controlling a complex electrical grid requires a suitable control and protection system which stabilizes the electrical grid, particularly in critical or unforeseen situations. Such a control and protection system is often also known as a CPS (Control and Protection System). A CPS is used as a control system for normal operating conditions of the electrical grid and also as a protection system for abnormal or critical operating conditions.

Especially in complex electrical grids with a large number of grid components, oscillations which span the grid components frequently occur in important operating parameters such as the current, voltage, output, load flow and/or phase. Such oscillations are often referred to as power oscillations (PO). They occur, for example, when a large power generator, such as a wind farm, is separated from the electrical grid. In such cases the loss of power caused thereby has to be compensated through other generators of the electrical grid producing additional power. The transition of power generation from the wind farm to one or more compensating generators generally exhibits a very complex dynamic transitional behavior, wherein the complexity is due to a plurality of grid-component-internal control loops of the involved grid components. In particular, the transition can lead to considerable oscillations between different generators which can result in failure of the electrical grid if suitable countermeasures are not taken in time.

Frequently used to dampen such oscillations are so-called power system stabilizers which are coupled to synchronous generators of conventional power stations. The power system stabilizers are often also known as PSS. In addition, other damping devices, such as PODs (Power Oscillations Dampers) are also used to damp oscillations in the case of HVDC stations. In general PSS and PODs are manually configured for a pre-determined set of test scenarios. In an operating range of the electrical grid covered by such test scenarios, acceptable oscillation damping can usually be achieved in this way. However, as soon as an unforeseen operating status or one not covered by the test scenarios suddenly occurs during the operation of the electrical grid, the damping efficiency can be considerably reduced and a critical situation can thereby arise.

SUMMARY

An aspect relates to a method, a control device, a computer program product (wherein the computer program product includes a non-transitory computer readable storage medium having instructions, which when executed by a processor, perform actions) as well as a computer-readable storage medium for controlling an electrical grid, which allow more efficient control and stabilization of the electrical grid.

According to embodiments of the invention, for controlling an electrical grid with several grid components, physical operating data of the grid components are recorded by sensors and, by way of the recorded physical operating data, a current operating status of the electrical grid is determined by way of a network model of the electrical grid which spans the grid components. A first grid component is controlled as a function of a control signal by means of a regulator with a grid-component-internal control circuit which is adjustable via control parameters. To determine a dynamic reaction of the first grid component to the control signal depending on the control parameters, a first component model of the first grid component is imported. As part of an optimization procedure the control parameters are then varied, wherein by means of the first component model as well as the network model, depending on the current operating status and the varied control parameters the dynamic reaction is determined and the control parameters are determined in such a way that the dynamic reaction fulfills a predetermined criterion. The regulator is then adjusted by the thus determined control parameters.

An essential advantage of embodiments of the invention can be seen in that internal, e.g. envisaged for damping of oscillations, regulators of grid components can be adjusted during on-going operation in an advantageous or almost optimal manner to the current, grid-component-spanning, operating status of the electrical grid. In this way in many specific operating conditions a regulating behavior can be achieved that is better, or at least better adapted to the current operating status.

Advantageous forms of embodiment and further developments of the invention are set out in the dependent claims.

According to an advantageous form of embodiment of the invention the control parameters can be determined in such a way that the dynamic reaction of the first grid component stabilizes the electrical grid. In this manner unwanted oscillations, e.g. current, voltage, output, load flow and/or phase oscillations in the electrical grid can be damped actively and in a manner adapted to the current operating status.

Furthermore, a second grid component of the electrical grid can be regulated as a function of a second control signal. A second component model of the second grid component can be imported to determine a second dynamic reaction of the second grid component to the second control signal. The dynamic reaction in process stage e) can then be determined by means of the second component model. In this way an influence of one or more second dynamic reactions of one or more second grid components on the dynamic reaction of the first grid components can be taken into consideration in order, for example, to improve the modelling accuracy and thereby the optimization of the control parameters.

Additionally, a plurality of dynamic reactions of a grid component to control signals can be recorded by means of sensors. A component model of the grid component can be adjusted in such a way that it essentially reproduces the plurality of dynamic reactions. This can take place, for example, through so-called fitting of model parameters of this component model. As a rule, in this manner a modelling accuracy of the component model can be considerably improved. Preferably, the adjustment of the component model can take place continuously as a function of the recorded operating data and/or depending on the current operating status. More particularly the dynamic reactions of the first and/or second grid component can be recorded in this way and the first and/or second component model adjusted as a function thereof.

According to another form of embodiment of the invention a component model, e.g. the first and/or second component model, can comprise structure data relating to a grid-component-internal structure of a grid component, e.g. the first and/or the second grid component. A black box component model of the grid component can be imported in order to determine output signals of the grid component as a function of input signals. The component model can be adjusted in such a way that it essentially reproduces output signals determined by the black box component model taking into consideration the structure data. This can take place, for example, through fitting of model parameters of the component model. In this way, using an available black box component model a so-called white box component model with a high degree of modelling accuracy can be generated for example. Preferably adjustment of the component model can take place continuously as a function of the recorded operating data and/or depending on the current operating status. Alternatively or additionally to the black box component model, a so-called gray box component model can be used.

According to a further advantageous form of embodiment of the invention, from the first component model and/or the network model a first component model linearized around the current operating status and/or a network model linearized around the current operating status can be generated. As a rule a non-linear component model and/or network model can be considerably simplified in this manner. In particular, using a linearized model the calculation, analysis and optimization of dynamic reactions requires considerably less time and effort.

In particular, by means of the linearized first component model and/or the linearized network model dynamic oscillation modes of the electrical grid can be determined. The control parameters can be determined in such a way that the regulator counteracts the determined oscillation modes. In this manner unwanted oscillations of the electrical grid can be actively and adaptively damped.

According to an advantageous further development of the invention in process stage (e) the linearized first component model can be used as the first component model and/or the linearized network model can be used as the network model for determining the control parameters. Depending on the thus determined control parameters and the current operating status, by means of a detailed simulation model a detailed dynamic reaction of the first grid component can then be determined. The regulator can be adjusted by the determined control parameter if the detailed dynamic reaction also fulfills the predetermined criterion. If, on the other hand, the detailed dynamic reaction does not fulfill the predetermined criterion, adjustment of the regulator can be suppressed and/or a renewed optimization cycle can be carried out, preferably taking the detailed dynamic reaction into account. In this way a simplified damping analysis and/or optimization of the control parameters can be carried out using the linearized models and first of all the optimization result checked in more detail by means of the detailed, possibly non-linear simulation model.

BRIEF DESCRIPTION

Some of the embodiments will be described in detail, with reference to the following figures, wherein like designations denote like members, wherein.

DETAILED DESCRIPTION

Figure 1:
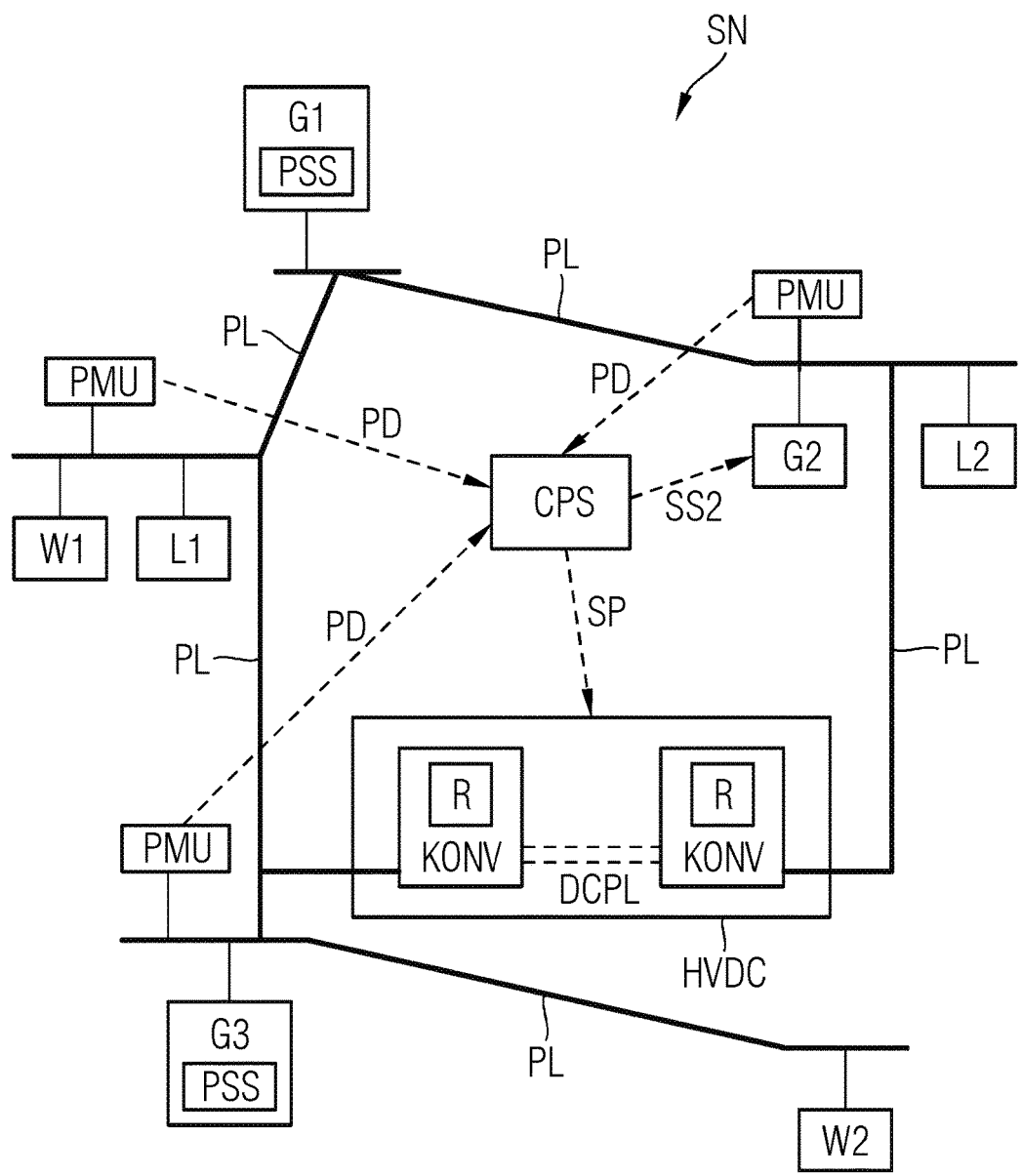
FIG. 1 shows an electrical grid with several grid components.

FIG. 1 schematically shows an electrical grid SN, e.g. a power supply grid, transmission network, distribution network and/or feed-in network. The electrical grid SN can include a number of grid components such as power generators, consumer loads, power lines, control devices, power stations, wind power installations, photovoltaic installations and/or other conventional or renewable sources of energy. The grid components can, in particular, comprise direct current components, e.g. HVDC components (HVDC: High Voltage Direct Current) or alternating current components, such as FACTS components (FACTS: Flexible AC Transmission System).

In the present example of embodiment the electrical grid SN includes as grid components conventional generators G1, G2 and G3, e.g. gas or nuclear power stations, renewable sources of energy W1 and W2, e.g. wind power installations or photovoltaic installations, consumer loads L1 and L2, a high voltage direct current transmission system HVDC as well as power lines PL which connect or interlink the aforementioned grid components. The power lines PL, which are shown in FIG. 1 by the thicker lines, can each be configured for alternating current or direct current.

The high voltage direct current transmission system HVDC has a high voltage line DCPL which at both ends is connected via converter stations KONV to the remainder of the electrical grid. The converter stations KONV each have an internal regulator R. In the present example of embodiment the regulators R are implemented as oscillation dampers, e.g. as so-called PODs (Power Oscillations Dampers), for damping oscillations in the electrical grid SN, e.g. current, voltage, output, load flow and/or phase oscillations. Such oscillations are frequently referred to as power oscillations.

The generators G1 and G3 each have an internal stabilization device PPS, e.g. a so-called power system stabilizer for damping generator oscillations. Such a stabilizing device PSS is also frequently referred to as a Power System Stabilizer (PSS).

Furthermore, at various points of the electrical grid SN physical sensors PMU are arranged for recording physical operating data PD of grid components of the electrical grid SN. As such sensors PMU, in particular so-called time-synchronized pointer-type measuring instruments frequently also referred to as Phasor Measurement Units (PMU) can be used. Such a time-synchronized pointer-type measuring instrument provides, in particular, measurements of current, voltage and phase angle, which are therefore often also referred to as PMU measurements. As physical operating data PD, local and/or grid-component-spanning operating data can be recorded, such as, for example, physical, regulating and/or design-dependent parameters such as output, active power, reactive power, frequency and/or PMU measurements. In particular, discrete parameters, which for example indicate an interruption, a short circuit or connection of transmission lines, can also be recorded as physical operating data. The physical operating data PD can, in particular, be recorded in the case of transmission lines, power stations, current generators and/or loads.

The electrical grid SN also has a control device CPS, e.g. a so-called Control and Protection System, for controlling the electrical grid SN. The control device CPS continuously receives the physical operating data from the sensors PMU. By way of the physical operating data PD the control device CPS continuously determines a current operating status of the electrical grid SN and, depending thereon, calculates in particular optimized control parameters SP for adjusting a first grid component as well as, if required, second control signals SS2 for controlling a second grid component. In the present example of embodiment the first grid component is the high voltage direct current transmission system HVDC and the second grid component the generator G2. Accordingly, the calculated control parameters SP are forwarded by the control device CPS to the transmission system HVDC and, if necessary, the calculated second control signals SS2 are forwarded to the generator G2.

In the present example of embodiment the internal regulators R of the first grid component HVDC can be adjusted from outside by the control device CPS by way of the control parameters SP. In this example of embodiment the transmission system HVDC as the first grid component is representative of preferably all grid components in which one or more internal regulators can be adjusted by the control device CPS.

Furthermore, for the present example of embodiment it is assumed that the second grid component, here the generator G2 does not have any internal regulators essential for the dynamics of the electrical grid SN which can be configured or adjusted by the control device CPS. The generator G2 can thus only be externally controlled by the control device CPS and does not allow any internal fine adjustment, at least not by the control device CPS. In this example of embodiment the generator G2 is representative of preferably all grid components in which internal regulators cannot generally be adjusted by the control device CPS.

Figure 2:
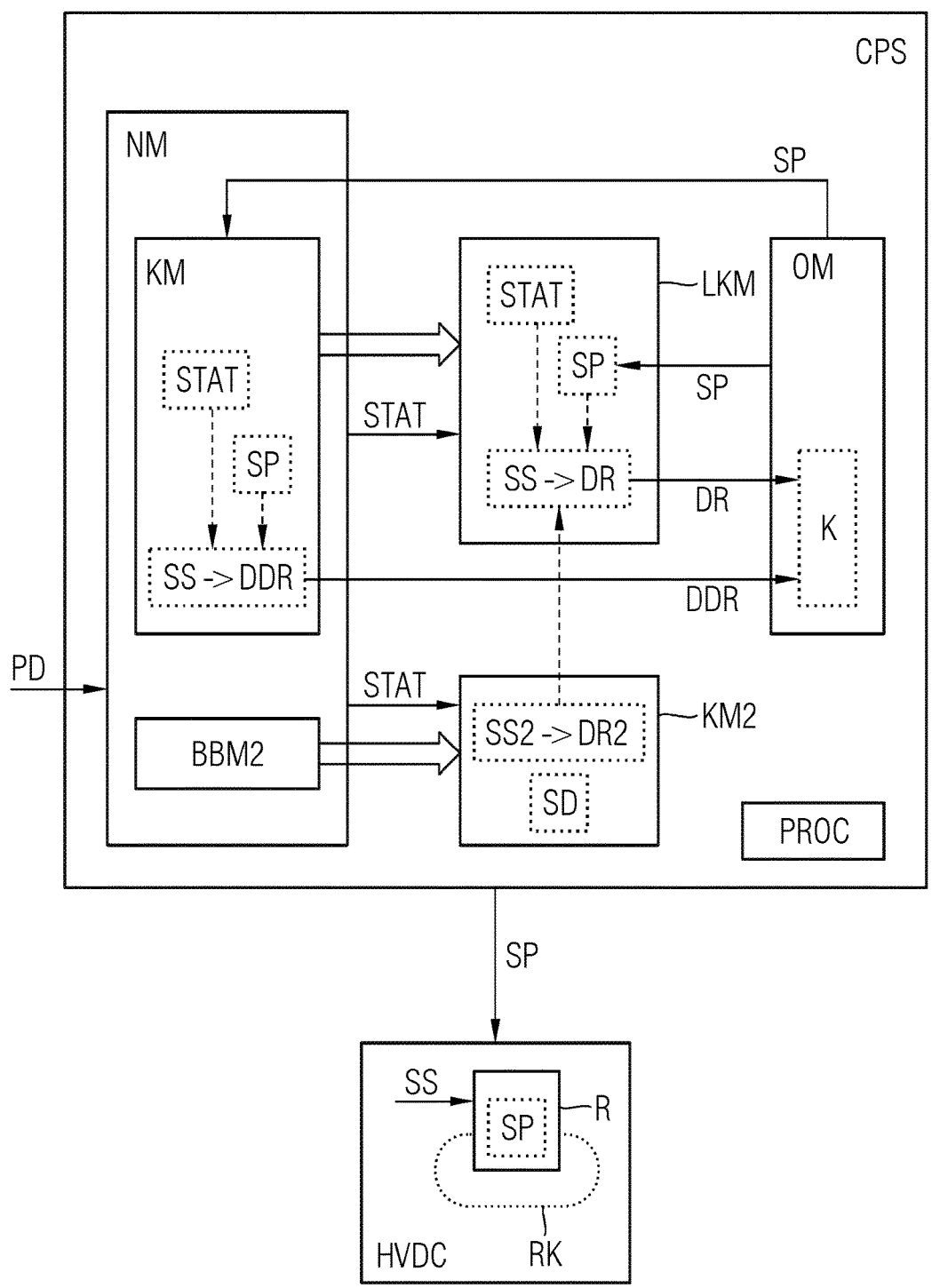
FIG. 2 shows a control device during the adjustment of a first grid component.

FIG. 2 schematically shows the control device CPS according to embodiments of the invention during adjustment of the first grid component, i.e. the HVDC transmission system. In the first grid component HVDC, in FIG. 2 only one of the regulators R is shown in a representative manner. This internal regulator R controls a grid-component-internal control circuit RK for regulating the first grid component HVDC. Here, the control circuit RK regulates grid-component-internal operating parameters of the first grid component HVDC.

The regulator R can be adjusted from outside through the control parameters SP by the control device CPS and can be controlled by a control signal SS. The externally adjustable control parameters SP determine in particular the dynamic regulating behavior of the regulator R. The control signal SS controls the first grid component HVDC by way of the regulator R. The control signal SS can originate from grid-component-external control elements, e.g. the control device CPS or grid-component-internal control elements which control the first grid component HVDC by way of the regulator R as a function of a current operating status of the electrical grid SN.

The control device CPS comprises one or more processors PROC for implementing all the process stages of the control device CPS. The control device CPS also has a grid-component-spanning network model NM of the electrical grid SN. The network model NM models and/or simulates a dynamic behavior of the electrical grid SN as well as its grid components, in particular a dynamic interlinking of energy generators and loads in the electrical grid SN. Here, the dynamic behavior comprises a physical dynamic such as a time frame of physical operating data, e.g. the course of a voltage, current, active power, reactive power, frequency and/or phase at pre-determinable points of the electrical grid SN. More particularly, the network model NM allows calculation of a current operating status STAT of the electrical grid SM using the physical operating data PD. The dynamic behavior is then determined as function of the current operating status STAT.

The current operating status STAT is preferably represented by a data structure which indicates the current physical and/or regulating states and/or properties of the electrical grid and/or its components. These can be, for example, system statuses, system parameters, operating data, operating conditions, secondary conditions and/or measurement parameters at pre-determinable points of the electrical grid SN.

The network model NM includes a first component model KM of the first grid component HVDC. The first component model KM models and/or simulates in detail an internal dynamic behavior of the first grid component HVDC, and in particular of the internal regulator R. For this purpose the first component model KM includes, in particular, information about the control parameters SP which can be adjusted from outside as well about the physical dynamics of the control circuit RK which depend thereon. The first component model KM in particular allows calculation of a detailed dynamic reaction DDR of the first grid component HVDC to the control signal SS depending on the current operating status STAT and the control parameters SP.

In this context a dynamic reaction is taken to mean a dynamic behavior of a grid component or the electrical grid SN during control and/or stimulation by a control signal. The dynamic behavior can in particular include oscillation modes and the damping thereof.

The network model NM also includes a black box component model BBM2 of the second grid component G2. The black box component model BBM2 allows calculation of output signals of the second grid component G2 as a function of its input signals, here, for example, the second control signals SS2. Preferably for every second grid component of the electrical grid SN a grid-component-specific black box component model is provided in the network model NM.

By way of the network model NM the control device CPS continuously determines the current operating status STAT using the received operating data PD.

From the black box component model BBM2 a second component model KM2 of the second grid component G2 is generated, as indicated in FIG. 2 by a broad arrow. During this the second component model KM2 is adjusted as a function of the currently determined operating status STAT in such a way that it essentially reproduces the dependency of the output signals on the input signals, modelled by the black box component model BBM2. For more precise adjustment of the second component model KM2, said second component model preferably has internal structure data SD relating to an internal structure of the second grid component G2, for which already substantiated assumptions about the internal structure often suffice. Alternatively or additionally the second component model KM2 can also be adjusted by way of a plurality of sensor-recorded dynamic reactions of grid components in such a way that it essentially reproduces this plurality of dynamic reactions.

The second component model KM2 models and/or simulates a dynamic behavior of the second grid component G2. In this way, the second component model KM2 determines second dynamic reactions DR2 of the second grid component model G2 to the second control signals SS2 depending on the current operating status STAT. Preferably for every second grid component of the electrical grid SN a grid-component-specific second component model is generated using the network model NM.

Moreover, as indicated by a broad arrow in FIG. 2, from the first component model KM a linearized first component model LKM of the first grid component HVDC is generated. For this purpose the first component model is linearized or developed around the current operating status STAT. The linearized first component model LKM models and/or simulates a linear dynamic behavior of the first grid component HVDC and, in particular, of the first regulator R as well as its control circuit RK as a function of the control parameters SP. The linearized first component model LKM allows particularly simple calculation of a dynamic reaction DR of the first grid component HVDC to the control signal SS depending on the current operating status STAT and the control parameters SP.

Preferably the entire network model NM can be linearized, wherein the first component model KM, the black box component model BBM2 and/or the second component model KM2 are linearized as parts of the network model NM. In particular, the linearized first component model LKM or the linearized network model can be used to determine dynamic oscillation modes of the electrical grid SN and thus for the damping analysis of said grid.

The linearization and/or the generation of the models NM, KM, BBM2, LKM and/or KM2 preferably take(s) place continuously and/or adaptively by way of continuously recorded physical operating data PD or the current operating status STAT. Advantageously the linearization and/or generation can be brought about by a respective change to the current operating status STAT.

The models NM, KM, BBM2, LKM and/or KM2 are preferably stored in a database or another storage system of the control device CPS and are imported from there. The above models each comprise a data structure, preferably with a plurality of model parameters for the purpose of object-oriented programming, said parameters modelling the physical and/or control characteristics of the grid components to be simulated and their dynamic and/or static dependencies on each other. Such characteristics are, for example, system attributes, system parameters, operating characteristics, operating data, operating conditions, secondary conditions and/or measuring variables.

The control device CPS also comprises an optimization module OM for varying and optimizing the control parameters SP as a function of the current operating status STAT. On the one hand, by way of the second component model KM2 or the network model NM the optimization module OM brings about the calculation of the second dynamic reactions DR2 to the second control signals SS2 depending on the current operating status STAT. On the other hand the optimization module OM varies the control parameters SP and forwards the varied control parameters SP to the linearized first component model LKM, or, expressed in a different way, parameterizes the linearized first component model LKM with these varied control parameters SP. For the, in each case, varied control parameters SP the dynamic reaction DR of the first grid component HVDC to the control signal SS is calculated by way of the linearized first component model LKM as a function of the current operating status STAT and taking into consideration the second dynamic reactions DR2. In FIG. 2 this taking into consideration of the second dynamic reactions DR2 is indicated by a dotted arrow.

In the present example of embodiment the dynamic reaction DR includes, in particular, the dynamic oscillation modes of the electrical grid SN as well as their respective damping. The dynamic reaction DR is forwarded from the linearized first component model LKM to the optimization module OM.

As part of the further optimization process, the control parameters SP are optimized by the optimization module OM in such a way that the dynamic reaction DR for these control parameters SP fulfills a predetermined criterion K. In the present example of embodiment, as criterion K it is predetermined that the oscillation modes or oscillations of the electrical grid SN should be damped as far as possible.

The thus optimized control parameters SP are forwarded by the optimization module OM to the first component model KM or, in other words, the first component model KM is parameterized through the optimized control parameters SP. By way of the thus parameterized first component model KM, depending on the current operating status STAT and the optimized control parameters SP, the detailed dynamic reaction DDR to the control signal SS is then determined. The detailed dynamic reaction DR is then transferred by the first component model KM to the optimization module OM and is checked there in terms of the predetermined criterion K.

If the detailed dynamic reaction DDR fulfills the criterion K the optimized control parameters SP are forwarded to the first grid component HVDC in order to adjust its regulator R. Otherwise the forwarding of the optimized control parameters SP to the first grid component HVDC is suppressed and/or a new optimization cycle is carried out, preferably taking the detailed dynamic reaction DDR into account.

The above determination, optimization and checking of the control parameters is carried out in on-going operation, i.e. online and in real time.

Described below is a typical application context of embodiments of the invention in which several grid components of an electrical grid contribute to the occurrence and damping of unwanted oscillations, but only one or a few of these grid components can be adjusted or finely adjusted by an operator during on-going operation of the electrical grid. Here, the adjustable grid components correspond to the first grid components and the non-adjustable grid components correspond to the second grid components of the present example of embodiment.

Typically the operator can only adjust and finely adjust his own grid components in on-going operation. For his own grid components, e.g. the first grid components, the operator generally has available a detailed component model, known as a white box model, which corresponds to the first component model KM in the present example of embodiment. For the second grid components the operator does not generally have any white box models available, but only black box models at most. For this reason, by way of the available black box models and/or by way of sensor-recorded operating data of the electrical grid, component models of the second grid components of adequate modelling quality are initially generated. These generated component models are equivalent to the second component model KM2 of the example of embodiment. Generation takes place continuously.

Physical operating data of the electrical grid are also aggregated and the current operating status of the electrical grid is determined therefrom.

In addition, the white box model as well as the generated component models are linearized or developed around the determined operating status. By way of these linearized models the oscillation eigenmodes of the linearly modelled physical dynamics of the grid components and/or the electrical grid are determined in their entirety. Using the determined oscillation eigenmodes a damping analysis for the oscillations of the electrical grid is carried out online and in real time. For this purpose, a number of standard methods are available.

By means of the white box model and the linearized component models, control parameters for the adjustable grid components are then determined which result in as extensive damping of the unwanted oscillations as possible. For this optimization a regulator design process for so-called SOF models (SOF: Static Output Feedback) can for example be used.

The optimized control parameters are then checked by means of a detailed simulation model, which in the present example of embodiment corresponds to the first component model KM, with regard to whether the predetermined criterion is also fulfilled in the case of detailed simulation. In the event of a positive result the optimized control parameters are used for adjusting the first grid components. Otherwise the adjustment of the first grid components is suppressed, a predetermined standard value is used or a renewed optimization cycle is carried out, preferably taking the detailed simulation results into account.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for controlling an electrical grid with grid components, wherein
   a) recording physical operating data of the grid components by sensors,
   b) determining by way of the recorded physical operating data, a current operating status of the electrical grid by way of a network model of the electrical grid which spans the grid components,
   c) controlling a first grid component as a function of a control signal by a regulator with a grid-component-internal control circuit which is adjustable via control parameters,
   d) importing a first component model of the first grid component to determine a dynamic reaction of the first grid component to the control signal depending on the control parameters,
   e) varying as part of an optimization procedure the control parameters, wherein the first component model as well as the network model, depending on the current operating status and the varied control parameters the dynamic reaction is determined and the control parameters are determined in such a way that the dynamic reaction fulfills a predetermined criterion, and
   f) adjusting the regulator by the thus determined control parameters.

2. The method as claimed in claim 1, wherein the control parameters are determined in such a way that the dynamic reaction of the first grid component stabilizes the electrical grid.

3. The method as claimed in claim 1, wherein a second grid component of the electrical grid is regulated as a function of a second control signal,
   that a second component model of the second grid component is imported to determine a second dynamic reaction of the second grid component to the second control signal and
   that the dynamic reaction in step e) is determined by the second component model.

4. The method as claimed in claim 1, wherein a plurality of dynamic reactions of a grid component to control signals is recorded by sensors, and
   that a component model of the grid component is adjusted in such a way that it essentially reproduces the plurality of dynamic reactions.

5. The method as claimed in claim 1, wherein a component model comprises structure data relating to a grid-component-internal structure of a grid component,
   that a black box component model of the grid component is imported for determining output signals of the grid component as a function of input signals, and
   the component model is adjusted in such a way that it essentially reproduces output signals determined by the black box component model taking into consideration the structure data.

6. The method as claimed in claim 5, wherein the network model includes the black box component model.

7. The method as claimed in claim 1, wherein from the first component model and/or the network model a first component model linearized around the current operating status and/or a network model linearized around the current operating status is generated.

8. The method as claimed in claim 7, wherein the linearized first component model and/or the linearized network model dynamic oscillation modes of the electrical grid can be determined, and that the control parameters can be determined in such a way that the regulator counteracts the determined oscillation modes.

9. The method as claimed in claim 7, wherein process stage the linearized first component model is used as the first component model and/or the linearized network model is used as the network model for determining the control parameters,
   that a detailed simulation model, as a function of the current operating status and the determined control parameters a detailed dynamic reaction of the first network component is determined, and
   that the regulator is adjusted by the determined control parameters if the detailed dynamic reaction fulfills the predetermined criterion.

10. The method as claimed in claim 9, wherein as a detailed simulation model, the first component model, the second component model, the network model, a non-linear simulation model and/or a black box simulation model is used.

11. A control device for controlling an electrical grid with several grid components, set up for implementing a method according to claim 1.

12. A non-transitory computer-readable storage medium comprising a computer program product for controlling an electrical grid as claimed in claim 1.

\* \* \* \* \*